United States Patent [19]

Huang

[11] Patent Number: 5,467,665
[45] Date of Patent: Nov. 21, 1995

[54] ADJUSTABLE, SHOCK-ABSORBING BICYCLE HANDLEBAR MOUNTING HARDWARE

[76] Inventor: Yuan-Hsin Huang, No. 18, Lun Tzu Chiao Road, Hsihu Town, Changhua County, Taiwan

[21] Appl. No.: 298,949

[22] Filed: Aug. 31, 1994

[51] Int. Cl.⁶ .......................... B62K 21/14; B62K 21/16
[52] U.S. Cl. .................. 74/551.2; 74/551.3; 280/275; 280/283
[58] Field of Search ................ 74/551.2–551.3, 74/551.6, 551.8; 280/275, 276, 283

[56] References Cited

U.S. PATENT DOCUMENTS 5,186,074  2/1993  Arnold .................. 280/276 X
5,241,881  9/1993  Chen ..................... 280/276 X

*Primary Examiner*—Rodney H. Bonck
*Assistant Examiner*—Mary Ann Battista
*Attorney, Agent, or Firm*—Merchant, Gould, Smith, Edell, Welter & Schmidt

[57] ABSTRACT

A bicycle handlebar mounting hardware including a coupling fixed to the stem on the head tube of a bicycle, an extension bar pivoted to the coupling to hold a handle bar and having a downward lug, and a shock absorbing device connected between the downward lug of the extension bar and the coupling to absorb shock waves from the stem, wherein when the shock absorbing device is loosened, the extension bar can be turned relative to the coupling to adjust the elevation of the handlebar; the handlebar is fixed at the adjusted elevation when the shock absorbing device is fixed again.

1 Claim, 6 Drawing Sheets

5,467,665

ADJUSTABLE, SHOCK-ABSORBING BICYCLE HANDLEBAR MOUNTING HARDWARE

BACKGROUND OF THE INVENTION

The present invention relates to a bicycle handlebar mounting hardware, and more particularly to an adjustable, shock-absorbing bicycle handlebar mounting hardware.

A bicycle handlebar mounting structure for a bicycle according to the prior art, as shown in FIG. 1, comprises a stem A for connection to the head tube, an extension tube B, a tubular handlebar holder C perpendicularly welded to the front end of the extension tube B for holding the handlebar and having a longitudinal split C1 disposed at the bottom, a locating device D welded to the tubular handlebar holder C at the bottom. The locating device D consists of a front part having a countersunk hole D1 and a rear part having a screw hole D2. When a screw bolt S is inserted through the countersunk hole D1 and threaded into the screw hole D2, the split C1 is closed, and therefore the handlebar (not shown) is fixed to the handlebar holder C. As the extension tube B is fixedly welded to the stem A, the elevation of the handlebar relative to the stem A cannot be adjusted to fit different riders. Furthermore, when the bicycle runs over an uneven road, shocks will be directly transmitted from the stem to the handlebar through the extension tube and the handlebar holder.

SUMMARY OF THE INVENTION

The present invention has been accomplished under the circumstances in view. It is one object of the present invention to provide a bicycle handlebar mounting hardware which absorbs shock-waves. It is another object of the present invention to provide a bicycle handlebar mounting hardware which can be adjusted to change the elevation of the handlebar. It is still another object of the present invention to provide a bicycle handlebar mounting hardware which fits any of a variety of existing bicycle models.

According to the preferred embodiment of the present invention, the bicycle handlebar mounting hardware comprises a coupling fixed to the stem on the head tube of a bicycle, an extension bar pivoted to the coupling to hold a handle bar and having a downward lug, and a shock absorbing device connected between the downward lug of the extension bar and the coupling to absorb shock waves from the stem. The shock absorbing device comprises a headed connecting bar turned about a rivet on the downward lug of the extension bar, a coupling block mounted around the rod section of the headed connecting bar, a brake holder received in an opening on the head of the headed connecting bar employing a headed screw bolt to hold a toothed brake block, a T-bar having a head pivotally connected to the coupling and a rack extended from the head and inserted into a longitudinal center through hole on the headed connecting bar and meshed with the toothed brake block, a cylindrical cushion mounted around the headed connecting bar and stopped between the coupling block and the head of the headed connecting bar, and a washer mounted around the headed connecting bar and stopped between the cylindrical cushion and the coupling block. When the headed screw bolt is loosened, the brake block is disengaged from the rack of the T-bar, and the extension bar is allowed to be turned relative to the coupling to adjust the elevation of the handlebar. The handlebar is fixed at the adjusted elevation when the headed screw bolt is screwed tight again.

DETAILED DESCRIPTION OF THE PREFERRED EMBODIMENT

Figure 1:
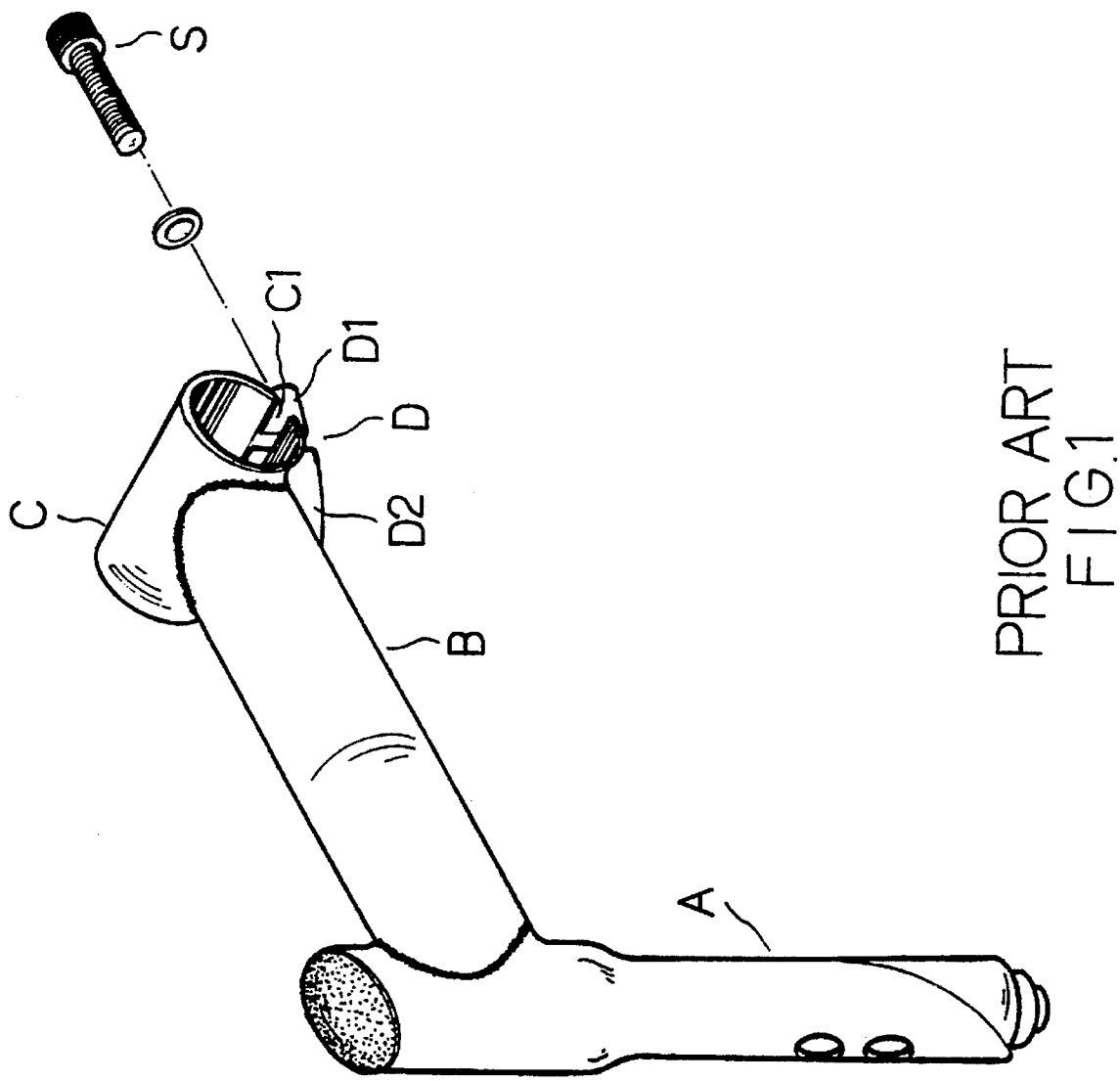
FIG. 1 shows a bicycle handlebar mounting structure according to the prior art.
Figure 2:
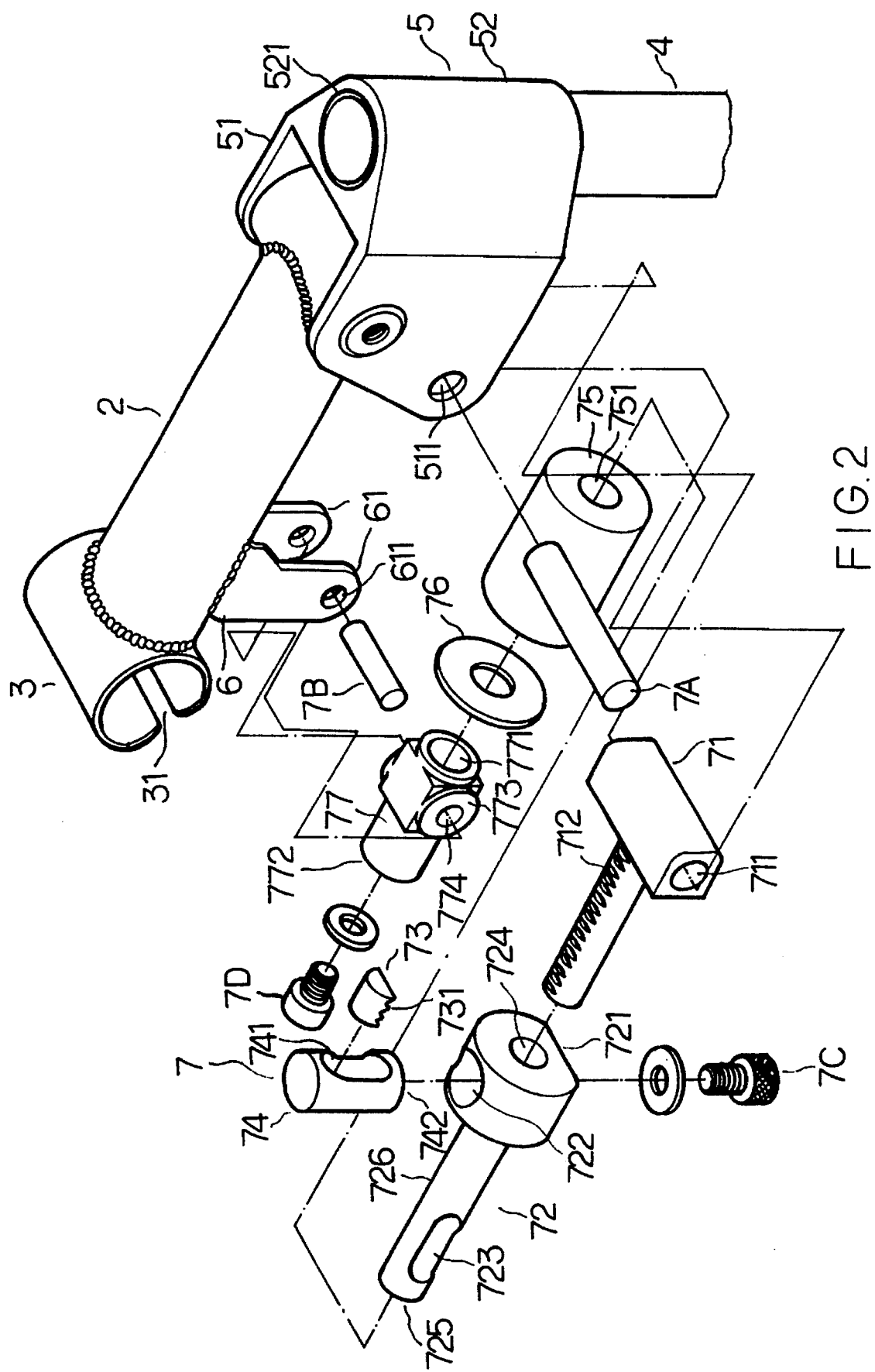
FIG. 2 is an exploded view of a bicycle handlebar mounting hardware according to the present invention.
Figure 3:
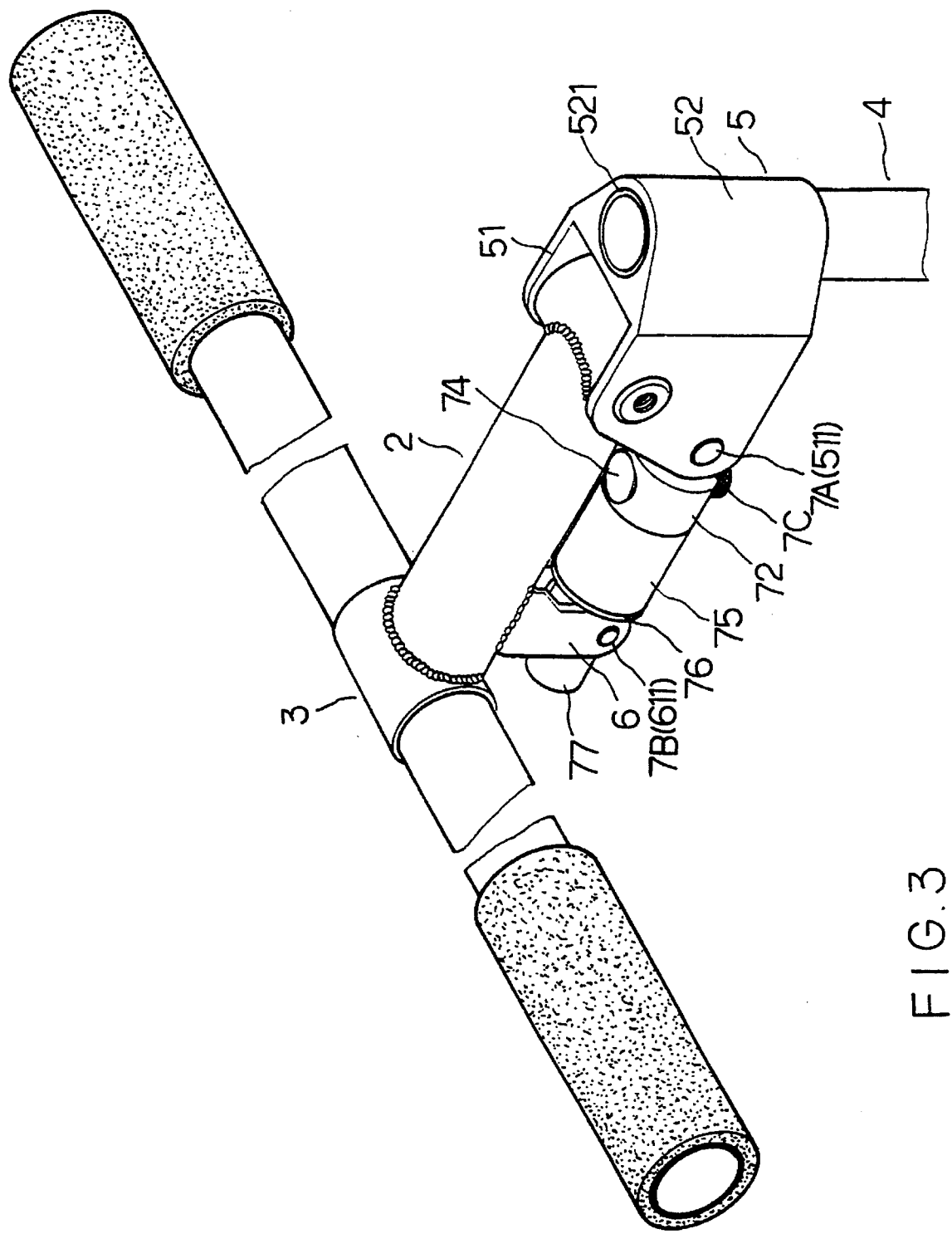
FIG. 3 shows the bicycle handlebar mounting hardware of FIG. 2 installed.

Referring to FIGS. 2 and 3, a coupling 5 is mounted on a stem 4, which is fastened to the head tube (not shown) of a bicycle, to hold an extension bar 2. The coupling 5 comprises a base 52, a vertical axle hole 521, which receives the stem 4, a substantially U-shaped coupling portion 51 with pivot holes 511 extended from the base 52 in a direction perpendicular to the vertical axle hole 521. The extension bar 2 has one end pivoted to the U-shaped coupling portion 51 and an opposite end terminating in a tubular handlebar holder 3. The handlebar holder 3 has a longitudinal split 31. When the handlebar is inserted through the handlebar holder 3, the split 31 is closed by fixture means (not shown), and therefore the handlebar is fixed to the handlebar holder 3. A lug 6 is perpendicularly welded to the extension bar 2 at the bottom near the handlebar holder 3, comprised of two parallel supporting walls 61 with a respective pivot hole 611. A shock absorbing device 7 is connected between the pivot holes 611 on the lug 6 and the pivot holes 511 on the coupling 5. The shock absorbing device 7 comprises a T-bar 71, a headed connecting bar 72, a brake block 73, a brake holder 74, a cylindrical cushion 75, a washer 76, and a coupling block 77.

Referring to FIG. 2 again, the T-bar 71 comprises an axle hole 711 and a rack 712 disposed perpendicular to the axle hole 711. The headed connecting bar 72 comprises circular rod section 726, a longitudinal center through hole 724 through the head thereof and the circular rod section 726, a screw hole 725 at one end of the longitudinal center through hole 724 remote from the head, an oblong hole 723 on the circular rod section 726 in communication with the longitudinal center through hole 724, a plane 721 on the head thereof, and an opening 722 through the head across the longitudinal center through hole 724. The brake block 73 is shaped like a half-sound rod having teeth 731 on the flat bottom wall thereof. The brake holder 74 is made of cylindrical shape having a screw hole 742 on one end thereof and a through hole 741 disposed in a radial direction. The cylindrical cushion 75 is compressible, having a longitudinal center through hole 751. The coupling block 77 comprises a longitudinal round hole 771, a longitudinal countersunk hole 772 longitudinally communicated with the longitudinal round hole 771, two opposite flanges 773 at two opposite sides by the longitudinal round hole 771, and a transverse through hole 774 through the flanges 773 and across the longitudinal round hole 771.

Figure 4:
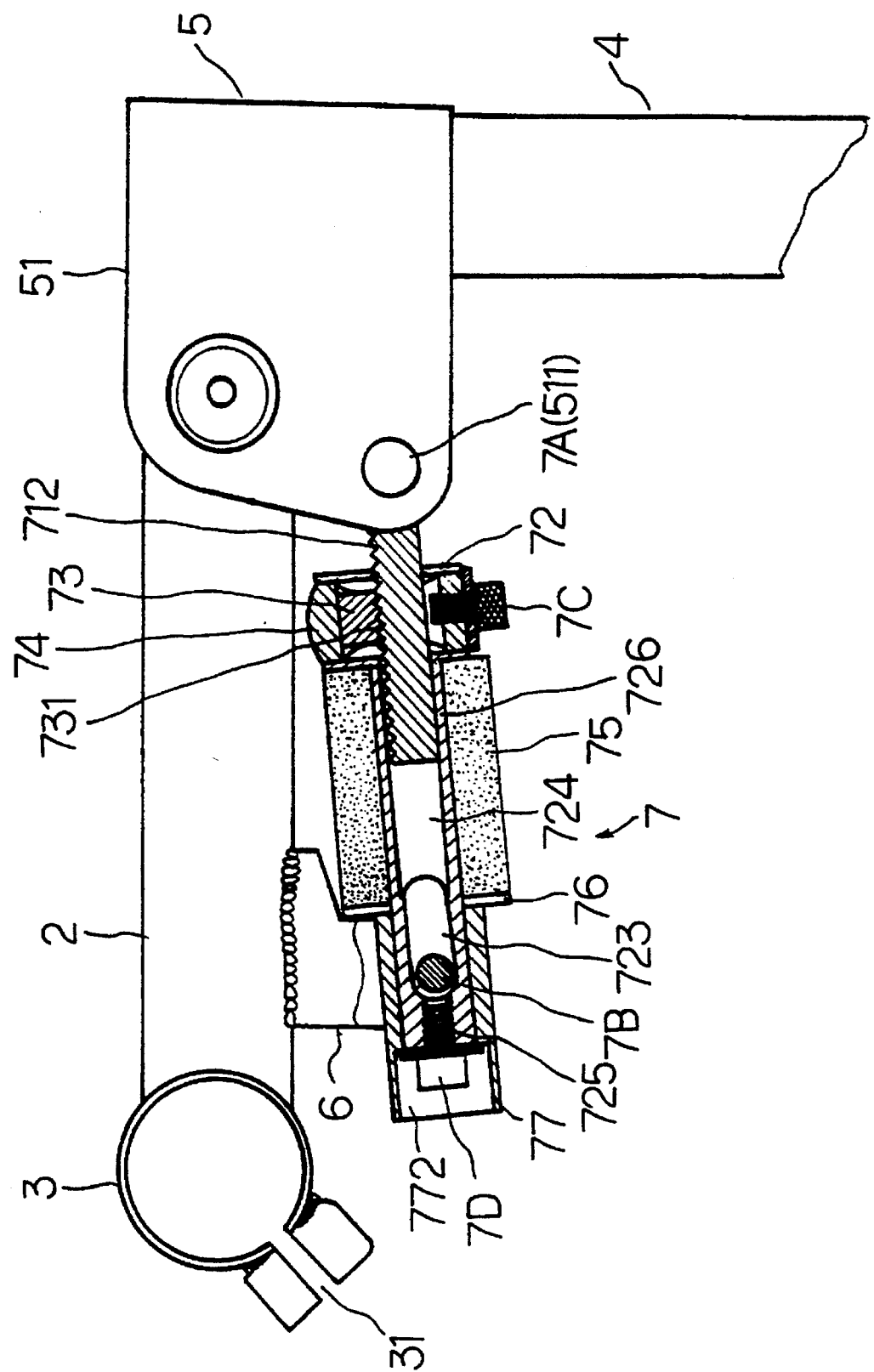
FIG. 4 is an assembly view in section of the bicycle handlebar mounting hardware of FIG. 2.

The assembly process of the bicycle handlebar mounting hardware is outlined hereinafter with reference to FIGS. 2, 3, and 4. The brake block 73 is inserted into the through hole 741 on the brake holder 74 and then the brake holder 74 is inserted into the opening 722 on the connecting bar 72, then the rod section 726 of the headed is connecting bar 72 inserted through the longitudinal center through hole 751 of the cylindrical cushion 75 and the washer 76, then the T-bar 71 into the longitudinal center through hole 724 on the connecting bar 72 and the through hole 741 on the brake holder 74 permitting the teeth 731 of the brake block 73 to mesh with the rack 712 of the T-bar 71, then a headed bolt 7C is inserted into the opening 722 and threaded into the screw hole 742 on the brake holder 74 with the head of the headed bolt 7C stepped outside the plane 721, and then the rod section 726 of the connecting bar 72 is inserted into the longitudinal round hole 771 of the coupling block 77, and then a headed screw bolt 7D is inserted into the countersunk hole 772 on the coupling block 77 and threaded into the screw hole 725 on the connecting bar 72, and then the flanges 773 of the coupling block 77 are connected between the support walls 61 of the lug 6 by inserting a rivet 7B into the transverse through hole 774 on the coupling block 77 and the oblong hole 723 on the connecting bar 72 and the pivot holes 611 on the lug 6 and then hammering down both ends of the rivet 7B, and then the T-bar 71 is connected to the U-shaped coupling portion 51 of the coupling 5 by inserting a rivet 7A into the pivot holes 511 on the U-shaped coupling portion 51 and the axle hole 711 on the T-bar 71 and then hammering down both ends of the rivet 7A.

Figure 5:
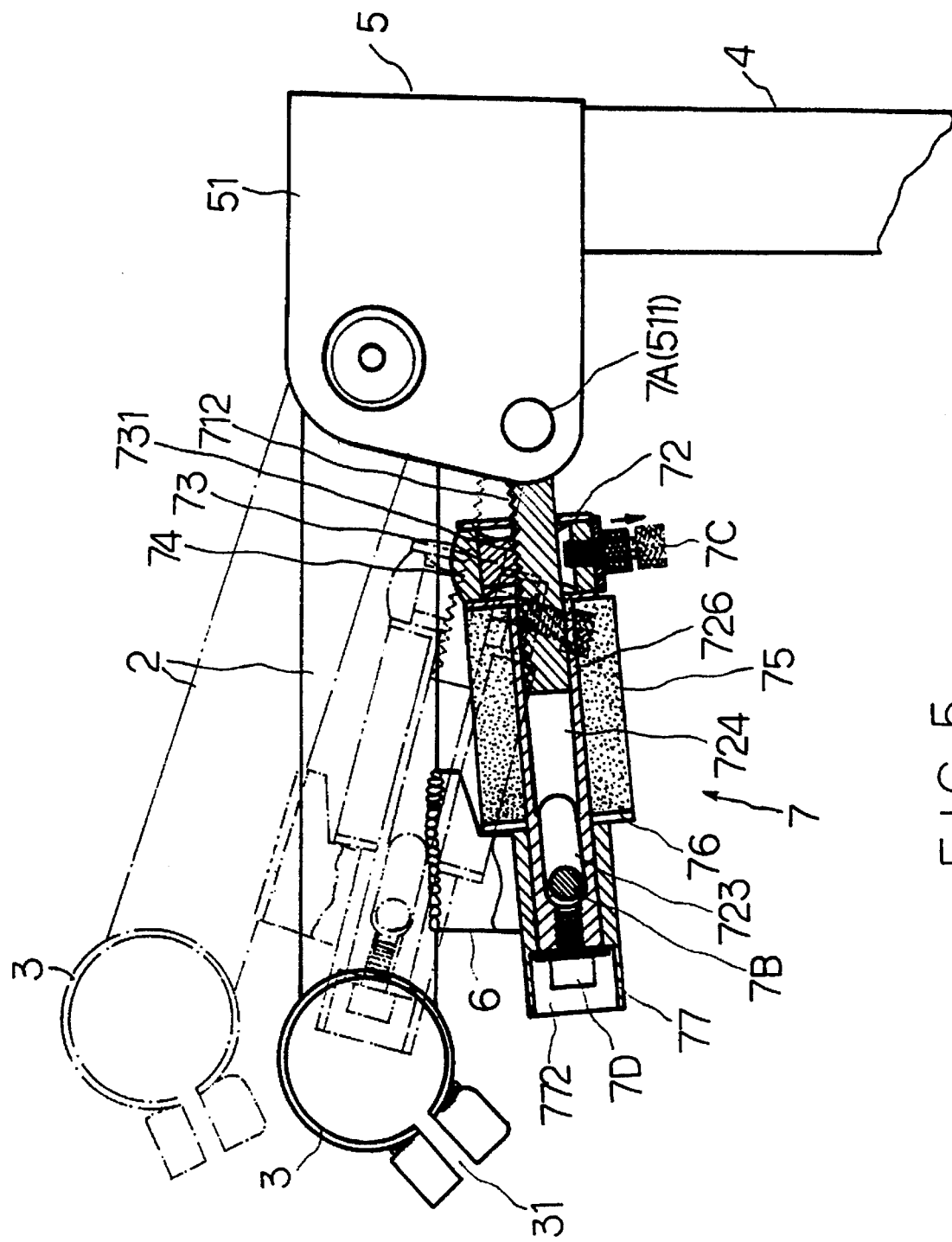
FIG. 5 is similar to FIG. 4 but showing the elevation of the handlebar adjusted.

The elevation of the handlebar, namely, the handlebar holder 3 can be adjusted by loosening the headed screw bolt 7C to release the rack 712 of the T-bar 71 from the teeth 731 of the brake block 73 for allowing the extension bar 2 to be turned relative to the coupling 5 to move the handlebar holder 3 to the desired elevation (See FIG. 5). After an adjustment, the headed screw bolt 7C is screwed tight again to fix the extension bar 2 in the adjusted position. Because the rivet 7B is inserted in the oblong hole 723 on the rod section 726 of the connecting bar 72, the connecting bar 72 can be moved in the longitudinal center hole 771 of the coupling block 77 longitudinally within the constraint of the oblong hole 723. Therefore, shock waves from the stem 4 can be lessened by means of the movement of the connecting bar 72 relative to the coupling block 77. The arrangement of the compressible, cylindrical cushion 75 can also absorb shock waves transmitted from the stem 4.

While only one embodiment of the present invention has been shown and described, it will be understood that various modifications and changes could be made without departing from the spirit and scope of the invention.

What is claimed is:

1. A bicycle handlebar mounting hardware comprising:

a coupling fixed to a stem on a head tube of a bicycle frame, having substantially U-shaped coupling portion, said U-shaped coupling portion having a first pair of pivot holes and a second pair of pivot holes at a lower elevation than that of said first pair of pivot holes;

an extension bar having a rear end pivotally connected between said first pair of pivot holes by a pivot and a front end terminating in a handlebar holder to hold a handlebar, said extension bar comprising a downward lug adjacent to said handlebar holder, said downward lug having two parallel supporting walls and a rivet connected between said parallel supporting walls;

a headed connecting bar turned about the rivet between said two parallel supporting walls, said headed connecting bar comprising a head, a cylindrical rod section extended from said head, a longitudinal center through hole through said head and said cylindrical rod section, a screw hole at one end of the longitudinal center through hole of said headed connecting bar remote from said head, an oblong hole on said cylindrical rod section, which receives the rivet between said two parallel supporting walls, a plane on said head, and an opening through said head;

a coupling block mounted around said cylindrical rod section of said headed connecting bar and turned about the rivet between said parallel supporting walls of said downward lug of said extension bar, said coupling block having a longitudinal through hole, which receives said cylindrical rod section of said headed connecting bar, and a countersunk hole longitudinally communicated with the longitudinal through hole of said coupling block;

a first headed screw bolt inserted into the countersunk hole on said coupling block and threaded into the screw hole at said one end of said headed connecting bar;

a brake holder received in the opening on the head of said headed connecting bar, having a screw hole on one end thereof and a through hole intersecting with the longitudinal center through hole of said headed connecting bar;

a second headed screw bolt having a head stopped outside the plane on the head of said headed connecting bar and a screw bolt body threaded into the screw hole on said brake holder;

a brake block in the shape of a half-round rod having teeth on a flat bottom wall thereof said brake block disposed within said through hole of said brake holder;

a T-bar having a head pivotally connected between said second pair of pivot holes on said U-shaped coupling portion of said coupling by a rivet, and a rack perpendicularly extended from the head of said T-bar and inserted into the longitudinal center through hole on said headed connecting bar and into the through hole of said brake holder and meshed with the teeth of said brake block;

a cylindrical cushion mounted around the cylindrical rod section of said headed connecting bar and stopped between the head of said T-bar and the head of said headed connecting bar; and a washer mounted around said cylindrical rod section of said headed connecting bar and stopped between said cylindrical cushion and the coupling block.

\* \* \* \* \*

UNITED STATES PATENT AND TRADEMARK OFFICE
CERTIFICATE OF CORRECTION

PATENT NO. : 5,467,665

DATED : November 21, 1995

INVENTOR(S) : Huang

Figure 6:
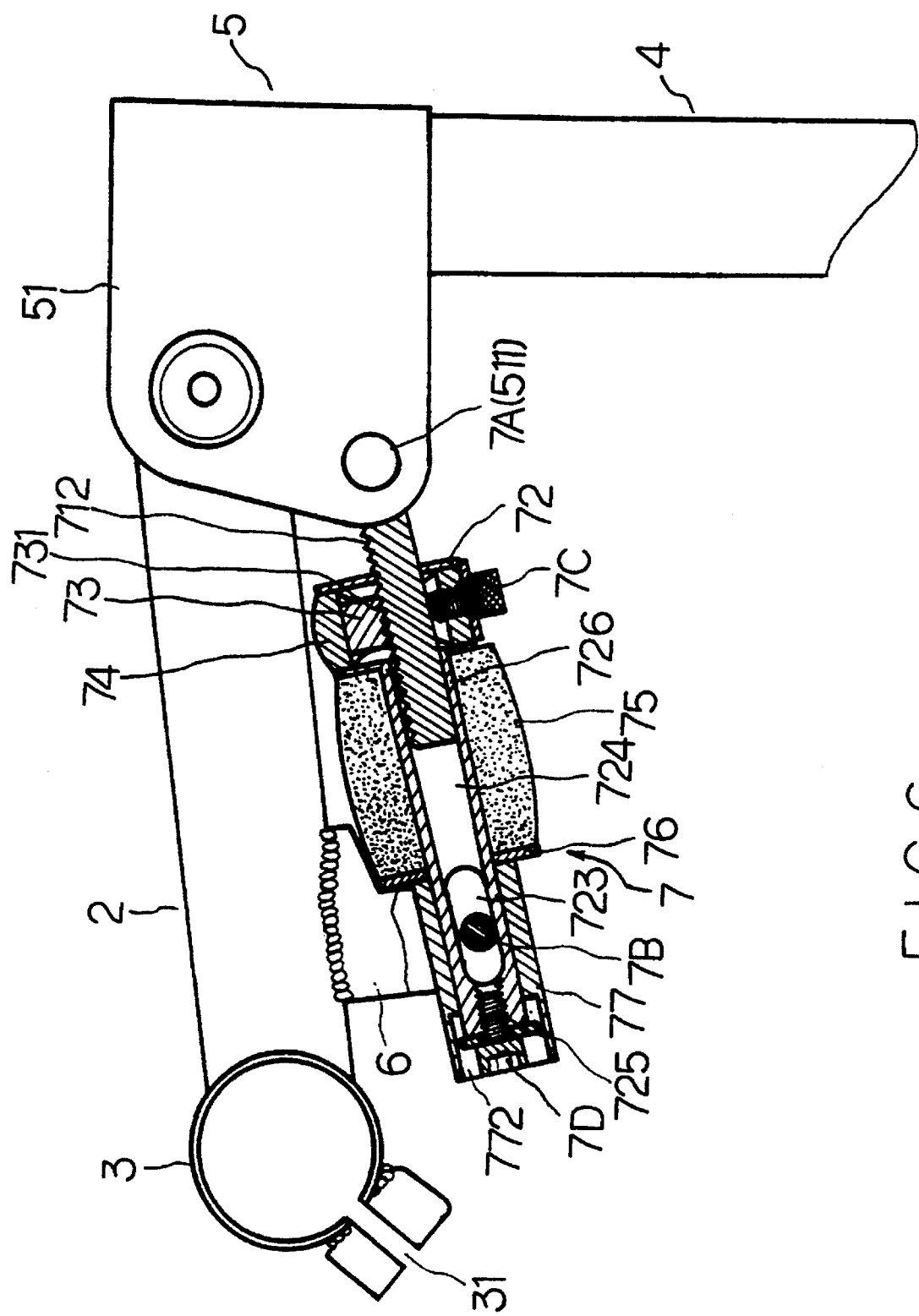
FIG. 6 is similar to FIG. 4 but showing the FIG. 6 is headed connecting bar moved in the coupling block relative to the rivet on the lug of the extension bar.

It is certified that error appears in the above-identified patent and that said Letters Patent is hereby corrected as shown below:

Col. 2, line 13 delete "Fig. 6 is" after the word "the"

Col. 2, line 54 "half-sound" should read --half-round--

Col. 3, line 4 delete "is" after the word "headed"

Col. 3, line 4 insert --is-- after the numeral "72"

Col. 3, line 7 insert --is-- after the numeral "71"

Col. 4, line 52 "head of said T-bar" should read --coupling block--

Signed and Sealed this

Seventeenth Day of December, 1996

BRUCE LEHMAN

*Attest:*

*Attesting Officer*  *Commissioner of Patents and Trademarks*